Dec. 21, 1937.            H. FRASER            2,103,156
ELECTRIC DRIVE OF AIR SCREW PROPELLED CARS
Filed Sept. 27, 1934          2 Sheets-Sheet 1
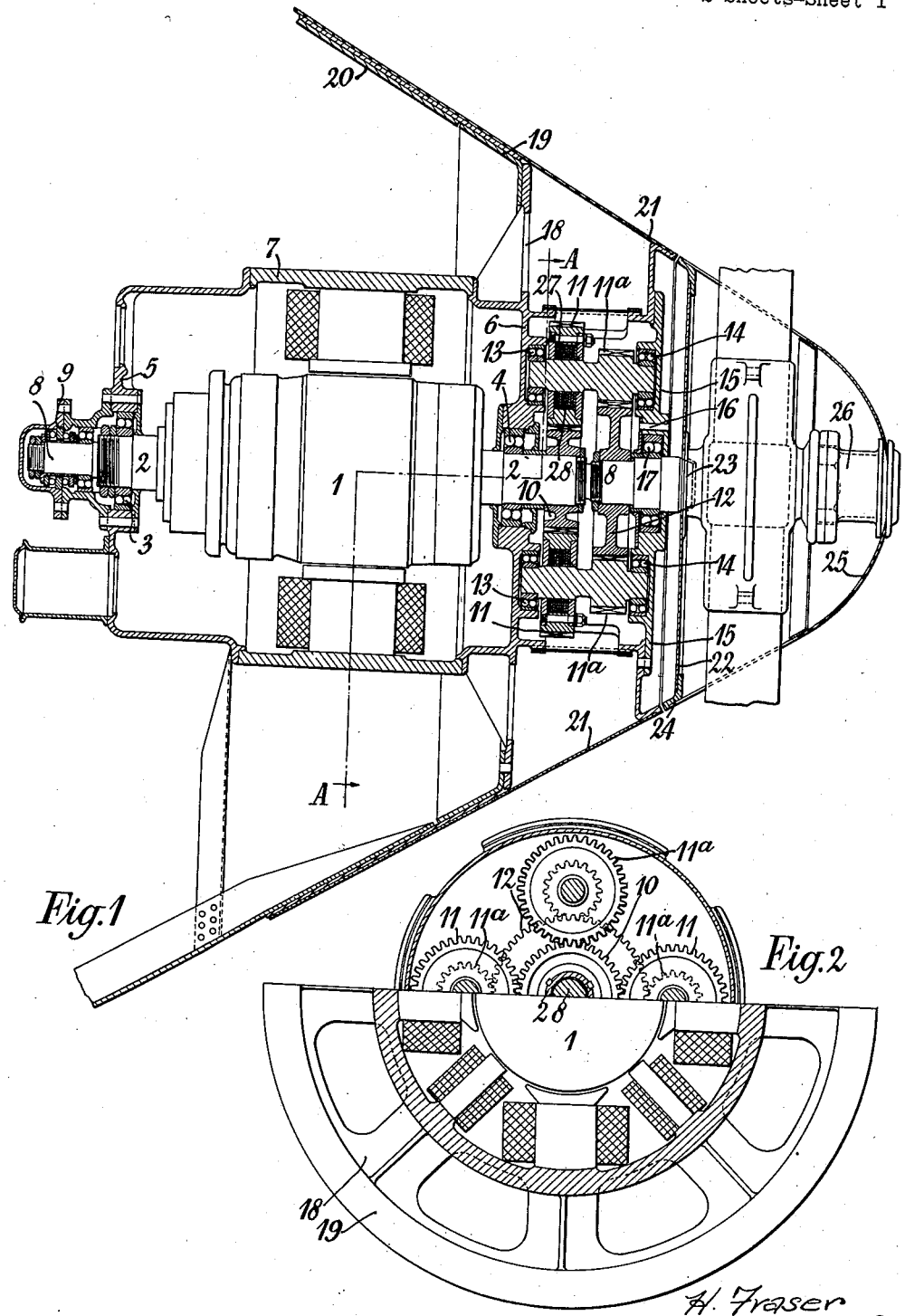

Dec. 21, 1937.  H. FRASER  2,103,156
ELECTRIC DRIVE OF AIR SCREW PROPELLED CARS
Filed Sept. 27, 1934  2 Sheets-Sheet 2
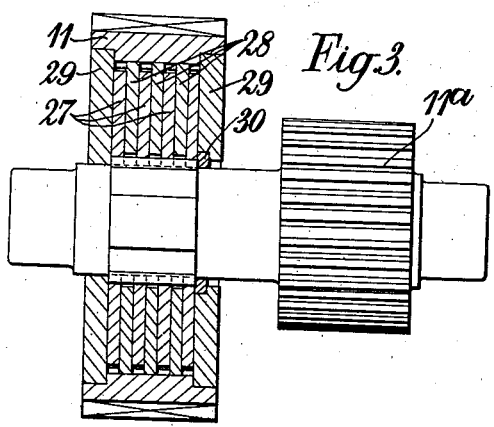

Patented Dec. 21, 1937

2,103,156

UNITED STATES PATENT OFFICE 2,103,156

ELECTRIC DRIVE OF AIR-SCREW PROPELLED CARS

Hugh Fraser, Burnside, Rutherglen, Scotland, assignor to Inter Counties Limited, Glasgow, Scotland Application September 27, 1934, Serial No. 745,824
In Great Britain February 28, 1934

1 Claim. (Cl. 74—410)

This invention has reference to electric drives of air-screw propelled cars, aircraft, and the like, suspended from overhead tracks.

My invention has for its object to provide an improved power unit for such cars and the like.

Another object of the invention is to provide an improved power unit in which torsional vibrations are more effectively damped than has heretofore been found possible.

Preferred embodiment of the invention will now be described by way of example with reference to the annexed drawings.

On the annexed two sheets of drawings:—

Figure 1 is a sectional elevation of a driving unit, the unit being shown fitted to a car, in accordance with the invention and with single motor.

Figure 2 is a section on the line A—A, Figure 1.

Figure 3 is an elevation partly in section of a pair of pinion wheels with clutch device incorporated therein.

Referring to the drawings:—

1 is an electric motor of standard design but provided with a hollow armature shaft 2, journalled in ball bearings 3 and 4 carried by two end covers 5 and 6 of the motor casing 7.

Extending through the armature shaft 2 is the air-screw shaft 8 to which is keyed the air-screw 8ª. Said shaft at its inner end, that is the end remote from the air-screw, is journalled in a double thrust bearing 9 carried by the inner end cover 5 of the motor casing. Fast on the outer end of the armature shaft is a spur wheel 10 with which mesh a number of pinion wheels 11 of special construction, the shaft of each of which has formed integral therewith a smaller pinion wheel 11ª. The latter in turn mesh with a spur wheel 12 fast on the air-screw shaft 8. The shafts of each pair of pinion wheels 11 and 11ª are, at their inner ends, journalled in ball bearings 13 housed in annular recesses formed in the outer face of the outer end cover 6 of the motor casing. The other ends of said shafts are journalled in ball bearings 14 housed within annular recesses formed in a plate 15 which constitutes a gear cover. Said plate is provided with a hub 16, within which is accommodated a ball race 17 through which the air-screw shaft extends. The commutator is located at the end of the motor remote from the air-screw.

The outer cover plate 6 of the motor casing is provided with a spider 18 having a flange 19 which conforms to and is adapted to be attached to the body 20 of the car or air-craft and to this flange is secured skin plating 21 which is formed in sections, is of truncated conical formation and extends to and is attached to the said gear cover plate 15.

Attached to the air-screw shaft is a light sheet-metal casing, which is intended to revolve with the air-screw, and to conform to the shape of the car. It consists of a circular diaphragm plate 22 fixed to a flange 23 attached to the air-screw shaft and attached to a machined flange 24 at its outer diameter, together with a portion of skin-plating extending between the blades of the air-screw and a portion of skin-plating 25 which is located and fixed with the locking arrangement of the air-screw nut 26. With wooden air-screws this shaped-revolving-nose of the car would be made in whole or in part as an integral part of the air-screw boss.

The pinions 11 of special construction above referred to are formed by a series of plates 27 mounted so as to rotate with their shafts, said plates taking every alternate plate in a multiple plate clutch, see Figure 3. Every other plate 28 is taken by the pinion wheel which is located axially and circumferentially by the covers 29 of the plate clutch. For this purpose a recess is formed in the inner cover and a ring 30 split across a diameter is inserted in this recess and bears against the ends of the splines formed on the shaft so that the pinion wheel is located axially. The whole is held together with bolts or studs with spring washers and pressure between the plates of the clutch is thus adjusted and maintained. These pinion wheels engage with the gear wheel fixed to the armature shaft as aforesaid.

It will be noted that the motor, casing, air-screw shaft and air-screw can be assembled into one unit for attachment to the car. The skin-plating 21 covering the gearing on being removed allows of a temporary bracket being attached to the outer motor casing cover so that the unit can be suspended above its centre of gravity for removal from the car. The advantages of this are as follows:—

(a) Complete driving units can readily be taken out and be replaced for any cause whatsoever.

(b) The air-screw can be "matched" with the remainder of the unit as regards balance before attachment to the car.

With a motor directly coupled to an air-screw a compromise has to be made between the best motor speed and best air-screw speed. And since there is very little variation in air-screw rotational speed as the car speed increases from rest to the maximum, both motor and air-screw can be designed for their best speeds if a reduction gearing such as is shown is incorporated, the gear ratio being equal to the ratio of best air-screw speed to best motor speed.

Again, as the lineal speed of the air-screw blade at its extremity is a function of the extent of propeller noise, a practically silent air-screw can be arranged for without undue sacrifice in over-all efficiency.

Further, the arrangement set forth also permits of streamlining that portion of the air-screw, namely, the boss and roots of the blades, which add to the inefficiency of the air-screw if exposed in moving air.

The arrangement of plate clutch in connection with the pinion wheels is for the following reasons:—

If each pair of pinion wheels 11 and 11a are rigidly fixed together on their respective shafts it will be impossible to arrange that equal amounts of power will be transmitted through each of the four shafts; in fact, the chances are all in favour of one shaft transmitting all the power. The intention, therefore, is to simplify assembly and by suitably adjusting the pressure between plates to ensure that each shaft takes an almost equal amount of power, and if torsional variations are set up in the air-screw shaft due to side winds on the air-screw blades, the plate clutches by slipping will damp these oscillations and prevent excessive torsional stresses in the air-screw and armature shaft.

What I claim is:—

An electric drive for air-screw propelled cars and the like, comprising an electric motor having a hollow armature shaft, a casing having end covers for said motor, bearings carried by said end covers in which the hollow armature shaft is journalled, an air-screw shaft extending completely through the armature shaft, further bearings carried by the two end covers of the motor casing and in which said air-screw shaft is journalled, said air-screw shaft extending beyond one of the end covers, an air-screw fast on the extended end of the air-screw shaft, a pinion wheel fast on the armature shaft, a set of pinion wheels meshing with and arranged symmetrically around said pinion wheel, a further set of pinion wheels co-axial with and driven by the first set, each pinion wheel of one of the sets embodying fast and slipping plates held in frictional engagement with each other so that the teeth can partake of a circumferential movement relative to the axis, and a pinion wheel fast on the air-screw shaft and with which said further set of pinion wheels mesh so as to drive the air-screw shaft without imparting any transverse thrust thereto, the fast and slipping plates ensuring that each of the intermediate pinions transmits its full share of the drive, absorbing shock and eliminating torsional vibration.

HUGH FRASER.